United States Patent

Seyed-Bolorforosh et al.

[11] Patent Number: 5,891,038
[45] Date of Patent: Apr. 6, 1999

[54] METHOD, APPARATUS AND APPLICATIONS FOR COMBINING TRANSMIT WAVE FUNCTIONS TO OBTAIN SYNTHETIC WAVEFORM IN ULTRASONIC IMAGING SYSTEM

[75] Inventors: Mir Said Seyed-Bolorforosh, Brookfield; Larry Y. L. Mo, Waukesha; Stanley Siu-Chor Chim, New Berlin, all of Wis.

[73] Assignee: General Electric Company, Milwaukee, Wis.

[21] Appl. No.: 778,202

[22] Filed: Dec. 30, 1996

[51] Int. Cl.⁶ .................................................. A61B 8/00
[52] U.S. Cl. ............................................................. 600/447
[58] Field of Search ..................................... 600/441, 443, 600/447; 73/599, 602; 367/11, 103, 105, 138

[56] References Cited

U.S. PATENT DOCUMENTS

| | | | |
|---|---|---|---|
| Re. 33,672 | 8/1991 | Miwa | 73/599 |
| Re. 35,148 | 1/1996 | Lizzi et al. | 72/602 |
| 4,155,259 | 5/1979 | Engeles | 73/626 |
| 4,322,974 | 4/1982 | Abele et al. | 73/602 |
| 4,534,357 | 8/1985 | Powers | 73/861.25 X |
| 4,569,231 | 2/1986 | Cornes et al. | 73/626 |
| 5,113,706 | 5/1992 | Pittaro | 73/626 |
| 5,183,047 | 2/1993 | Burckhardt | 600/455 |
| 5,361,767 | 11/1994 | Yukov | 600/442 |
| 5,608,690 | 3/1997 | Hassach et al. | 367/138 |
| 5,622,177 | 4/1997 | Breinnesser et al. | 600/462 |
| 5,696,737 | 12/1997 | Hossach et al. | 367/138 |
| 5,738,097 | 4/1998 | Beach et al. | 600/455 |

*Primary Examiner*—Francis J. Jaworski
*Attorney, Agent, or Firm*—Dennis M. Flaherty; John H. Pilarski

[57] ABSTRACT

A signal processing technique for improving the axial resolution and/or the sensitivity of an ultrasonic imaging system. This technique also improves the lateral resolution and the depth of field. The technique is based on combining two or more transmit wave functions in an optimal manner to achieve a synthetic waveform which has greater bandwidth and/or energy than the individual wave functions. This scheme operates on the imaging data before the data reaches the envelope detector, while the phase information is still maintained within the signal. Using a synthetic transmit wave design approach, the effective emitted pressure waveform would have a bandwidth which would be wider than the transducer bandwidth with high sensitivity. The synthetic transmit waveform design scheme consists of firing two or more relatively long transmit waveforms for each single A-line in a given focal zone. The frequency spectrum for each of these transmit pulses is centered at a slightly different frequency. The received signals from all of these transmit waveforms are added, while maintaining their phase information, to produce a synthetic waveform having an wider bandwidth than that of an impulse excitation.

31 Claims, 11 Drawing Sheets

OPTIMAL CONVENTIONAL TRANSMIT    SYNTHETIC TRANSMIT WAVEFORM

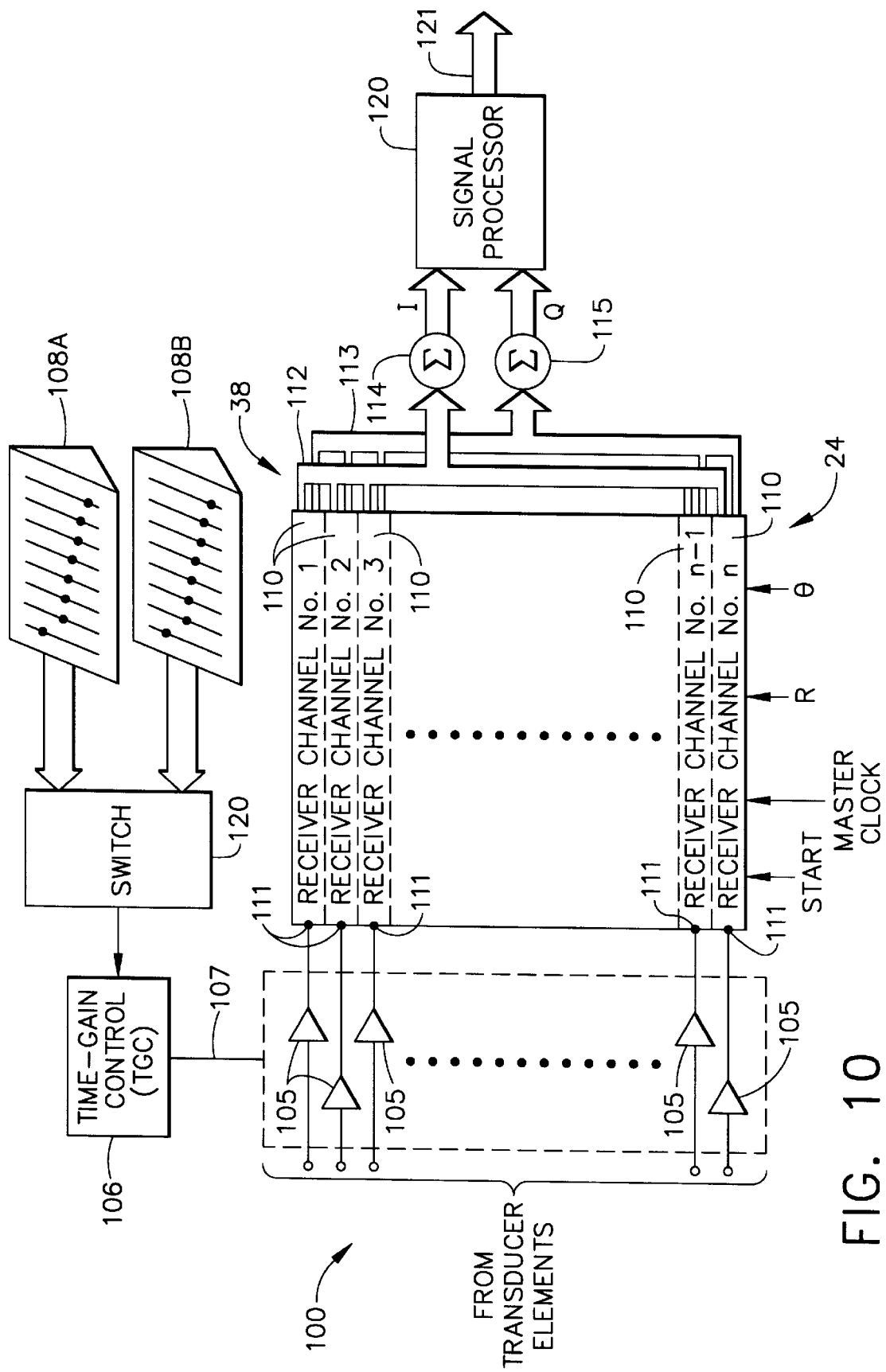

METHOD, APPARATUS AND APPLICATIONS FOR COMBINING TRANSMIT WAVE FUNCTIONS TO OBTAIN SYNTHETIC WAVEFORM IN ULTRASONIC IMAGING SYSTEM

FIELD OF THE INVENTION

This invention generally relates to ultrasound imaging, primarily clinical ultrasound images as well as industrial ultrasonic images. In particular, the invention relates to a method for improving the axial resolution, contrast resolution, lateral resolution, depth of field and sensitivity of an ultrasonic imaging system.

BACKGROUND OF THE INVENTION

Conventional ultrasound imaging system comprise an array of ultrasonic transducers which are used to transmit an ultrasound beam and then receive the reflected beam from the object being studied. For ultrasound imaging, the array typically has a multiplicity of transducers arranged in a line and driven with separate voltages. By selecting the time delay (or phase) and amplitude of the applied voltages, the individual transducers can be controlled to produce ultrasonic waves which combine to form a net ultrasonic wave that travels along a preferred beam direction and is focused at a selected range along the beam. Multiple firings may be used at various depths or different positions in the image to acquire a full two dimensional data set representing the desired anatomical information along a multiplicity of scan lines. The beamforming parameters of each of the firings (or transmitted beams) may be varied to provide a change in the position of focus, depth of field or the shading (or apodization) function. Similarly, the beam forming parameters can be changed for the received beam. A dynamic receive beam is typically used for the reception where the delay focus is continuously changed as different data are received from different depths. However, during the transmission a beam of ultrasound energy with a specific focal position is transmitted. Typically multiple beams are transmitted along the same direction with different focal lengths for improved resolution. Multiple transmit and reception beams are used in a plane to construct a two dimensional image.

The same principles apply when the transducer is employed to receive the reflected sound (receiver mode). The voltages produced at the receiving transducer elements are summed so that the net signal is indicative of the ultrasound reflected from a single focal point in the object. As with the transmission mode, this focused reception of the ultrasonic energy is achieved by imparting separate time delay (and/or phase shifts) and gains to the signal from each receiving transducer element. The reflected ultrasound is sampled from the focal zones of two or more transmit beams each focused at different depths along the same scan line. In most recent ultrasound imaging systems the received signal is dynamically focused as signals from different depths are received. For each steering angle, the sampled data from contiguous focal zones is acquired and then spliced to make one vector or A-line. A multiplicity of transmit vectors, one beam for each focal point, are used, along with interpolated data values, are used to collect all the image information which are displayed on the monitor to form a full image frame. This information is displayed on a pixel by pixel basis.

Such scanning comprises a series of measurements in which the steered or non-steered beams of ultrasonic wave is transmitted, the system switches to receive mode after a short time interval, and the reflected, or backscattered, ultrasonic wave is received and stored. Typically, transmission and reception are steered in the same direction during each measurement to acquire data from a series of points along a scan line. Multiple reception beams can be formed for a single transmit beam for improved frame rate. For example, for a single transmit beam two reception beams on either side of transmit beam can be formed simultaneously using parallel beamforming or alternatively using high-speed a multiplexed beamforming which would process both beams simultaneously. The receiver is dynamically focused at a succession of ranges or depths along the scan line as the reflected ultrasonic waves are received.

Referring to FIG. 1, the ultrasonic imaging system incorporating the invention includes a transducer array 10 comprised of a plurality of separately driven transducer elements 12, each of which produces a burst of ultrasonic energy when energized by a pulsed waveform produced by a transmitter 22. The ultrasonic energy reflected back to transducer array 10 from the object under study is converted to an electrical signal by each receiving transducer element 12 and applied separately to a receiver 24 through a set of transmit/receive (T/R) switches 26. Transmitter 22, receiver 24 and switches 26 are operated under control of a digital controller 28 responsive to commands by a human operator. A complete scan is performed by acquiring a series of echoes in which switches 26 are set to their transmit position, transmitter 22 is gated ON momentarily to energize each transducer element 12, switches 26 are then set to their receive position, and the subsequent echo signals detected by each transducer element 12 are applied to receiver 24, which combines, or beamform, the separate echo signals from each transducer element to produce a single echo signal which is used to produce a line in an image on a display monitor 30.

Transmitter 22 drives transducer array 10 such that the produced beam of ultrasonic energy is directed, or steered, along a specific steering angle. To accomplish this, transmitter 22 imparts a time delay $T_i$ to the respective pulsed waveforms 34 that are applied to successive transducer elements 12. By adjusting the time delays $T_i$ appropriately in a conventional manner, the ultrasonic beam can be directed away from the normal to the plane of transducer array 36, by an angle θ and/or focused at a fixed range R. A sector scan is performed by progressively changing the time delays $T_i$ in successive excitations. The angle θ is thus changed in increments to steer the transmitted beam in a succession of directions.

The echo signals are produced by each burst of ultrasonic energy, reflect from objects located at successive ranges along the ultrasonic beam. The echo signals are sensed separately by each transducer element 12 and a sample of the magnitude of the echo signal at a particular point in time represents the amount of reflection occurring at a specific range. Due to the differences in the propagation paths between a reflecting point P and each transducer element 12, however, these echo signals will not be detected simultaneously and their amplitudes will not be equal. Receiver 24 amplifies the separate echo signals, imparts the proper time delay to each, and sums them to provide a single echo signal which accurately indicates the total ultrasonic energy reflected from point P located at range R along the ultrasonic beam oriented at the angle θ. Demodulation can occur either before or after the individual received signals are summed together.

To simultaneously sum the electrical signals produced by the echoes impinging on each transducer element 12, time delays are introduced into each separate transducer channel 110 of receiver 24 (see FIG. 2). The beam time delays for reception are delays ($T_i$) which are applied in a similar manner as the transmission delays described above. However, the time delay of each receiver channel is continuously changing during reception of the echo to provide dynamic focusing of the received beam at the range R from which the echo signal emanates.

Under the direction of digital controller 28, receiver 24 provides delays during the scan such that steering of receiver 24 tracks the direction θ of the beam steered by transmitter 22 and samples the echo signals at a succession of ranges R and provides the proper delays and phase shifts to dynamically focus the beam. Thus, each transmission of an ultrasonic pulse waveform results in the acquisition of a series of data points which represent the amount of reflected sound at points in the focal zone of the transmit beam.

Referring to FIG. 1, scan converter/interpolator 32 receives the series of data points produced by receiver 24 and converts the data into the desired image for display. In particular, the scan converter converts the acoustic image data from polar coordinate (R___θ) sector format or Cartesian coordinate linear array to appropriately scaled Cartesian coordinate display pixel data at the video rate. This scan-converted acoustic data is then output for display on display monitor 30, which images the time-varying amplitude of the envelope of the signal as a gray scale.

Referring to FIG. 2, a conventional receiver 24 comprises three sections: a time-gain control section 100, a receive beamforming section 38 and a processor 102. Time-gain control (TGC) section 100 includes a respective amplifier 105 for each of the receiver channels 110 and a time-gain control circuit 106. The input of each amplifier 105 is connected to a respective one of transducer elements 12 to amplify the echo signal which it receives. The amount of amplification provided by amplifiers 105 is controlled through a control line 107 that is driven by TGC controller 106. The TGC is a combination of the potentiometers 108 which are set by the operator together with a constant gain profile, programmed into the controller, which compensates for tissue attenuation and diffraction gain variation in the image.

The receive beamforming section 38 of receiver 24 includes separate receiver channels 110. Each receiver channel 110 receives the analog echo signal from one of amplifiers 105 at an input 111. Each received signal is delayed before being summed at the summing point 114 and 115. This delay provides the dynamic focusing which is essential for high resolution imaging. The summed signals indicate the magnitude and phase of the echo signal reflected from a point P located at range R on the steered beam (θ). Each amplified signal is conveyed as a pair of quadrature signals in the respective receiver channel, where the phases of the mixing reference frequency differ by 90°. Alternatively the quadrature signals can be produced using the Hilbert transform. A signal processor 120 receives the beam samples from summing points 114 and 115 and produces an output 121 to scan converter 32 (see FIG. 1). The signal processor 120 sums the square of the I and Q signals before taking the square root of this signal. This produces the envelope detected or demodulated image signal. Alternatively, the demodulation can be performed after the individual received signals are summed. The signal processor 120 comprises an envelope detector for forming the envelope of the complex signals (I and Q), at which point the phase information is lost.

The axial resolution of an ultrasound imaging system of the foregoing type is primarily determined by the finite bandwidth of the transducer. In accordance with conventional ultrasound imaging methods, the highest possible resolution is obtained by means of an impulse excitation which utilizes the entire available bandwidth of the transducer. Unfortunately, the available energy in an impulse excitation is low, which results in poor sensitivity. In order to compensate for this, a larger driver pulse can be used. However, there are a number of factors which limit the amount of peak-to-peak voltage which can be applied to a transducer. These limitations are brought about by the finite peak-to-peak voltage available from the driver electronics, the breakdown voltage of the piezoceramic material and the possibility of depoling of the piezoceramic or piezoelectric material, the need for high-voltage driver stages and regulatory limits on the peak pressure to which a patient can be exposed. Furthermore, under impulse excitation the bandwidth of the emitted pulse is limited to the transducer bandwidth. The increased bandwidth would result in an improved spatial resolution, improved contrast resolution and an improved depth of field.

SUMMARY OF THE INVENTION

The present invention is a new signal processing technique for improving the resolution and/or the sensitivity of an ultrasonic imaging system together with an extended depth of field. The technique is based on combining two or more transmit wave functions in an optimal manner to achieve a synthetic waveform which has greater bandwidth and/or energy than the individual wave functions. Methods to improve the technique by improving the frame rate, reducing the motion induced errors in the processing, adjusting the phase of transmit waveforms for optimum response, combining different imaging modes by selectively using echo signals corresponding to individual or multiple transmit waveforms and its application for ultrasound imaging using contrast agents are described. This invention applies to all imaging modes (B. M, Color, Pulsed Doppler Imaging and Doppler). This scheme operates on the imaging data before the data reaches the envelope detector, while the phase information is still maintained within the signal. This is different from conventional frequency compounding which is generally performed after envelope detection, or incoherent summation, to reduce speckle.

The concept of performing a coherent summation of backscattered narrowband RF signals centered at different frequencies to obtain a flat frequency response was previously described ["Influence of heart rate, preload, afterload, and isotropic state on myocardial ultrasonic backscatter" by K. B. Sagar et al., Laboratory Investigation Ultrasound, circulation 77, No. 2, pp. 478–483, 1988]. However, this was purely a tissue characterization study whereby an unfocused disc transducer was used to measure the backscatter coefficient of cardiac tissue in a very small range-gated subendocardial region. For each subject the coherent summation was performed off-line based on separately stored range-gated data for different frequency scans, and the result is a single numeric estimate of the backscatter coefficient of the range-gated tissue region. In contrast, the present invention pertains to use of synthetic transmit waveforms for real-time, two-dimensional imaging using a general purpose ultrasonic scanner with a transducer array. Specifically, this invention discloses:

(1) The details of the transmit waveform design procedure for optimum synthetic waveform design.

(2) Means to reduce and/or compensate for the motion-induced errors which can result in a significant degradation of the image when using synthetic waveform design.

(3) The optimum detection hardware to combine the two waveforms.

(4) The application of the synthetic waveform design to increase the transmit depth of field in an image.

(5) The application of the synthetic transmit waveform design to improve the sensitivity while maintaining wide bandwidth.

(6) The application of combining different imaging modes whereby the individual waveforms are used for color/Doppler mode imaging and when two or more waveforms at different frequencies are combined the B-mode or the M-mode images are generated.

(7) The application of synthetic waveform imaging for ultrasonic imaging using contrast enhancement agents.

(8) Means to increase the frame rate by having overlapping vectors and by having the two transmit focal zones at a slightly different position.

Using a synthetic transmit wave design approach, the emitted pressure of the combined waveforms would have a bandwidth which would be wider than the transducer impulse response and/or with higher sensitivity. It also provides larger depth of field together with improved contrast resolution.

The synthetic transmit waveform design scheme in accordance with the preferred embodiment of the invention consists of firing two or more relatively long transmit waveforms in succession, both transmit waveforms being focused at the same focal position and the frequency spectrum for each of these transmit pulses being centered at slightly different frequencies. Once the received signals from all of these transmit waveforms are added, while maintaining their phase information, the resultant synthetic waveform will have an overall bandwidth which can be higher than even an impulse excitation. This scheme also results in an improved sensitivity due to the increased energy associated with the longer transmit pulse length. Compared to an impulse excitation (applied twice), a two-waveform synthetic approach can produce a response with greater sensitivity and/or wider bandwidth.

BRIEF DESCRIPTION OF THE DRAWINGS

FIG. 10 is a block diagram of a receiver in accordance with the preferred embodiment of the invention.

DETAILED DESCRIPTION OF THE PREFERRED EMBODIMENTS

Figure 3:
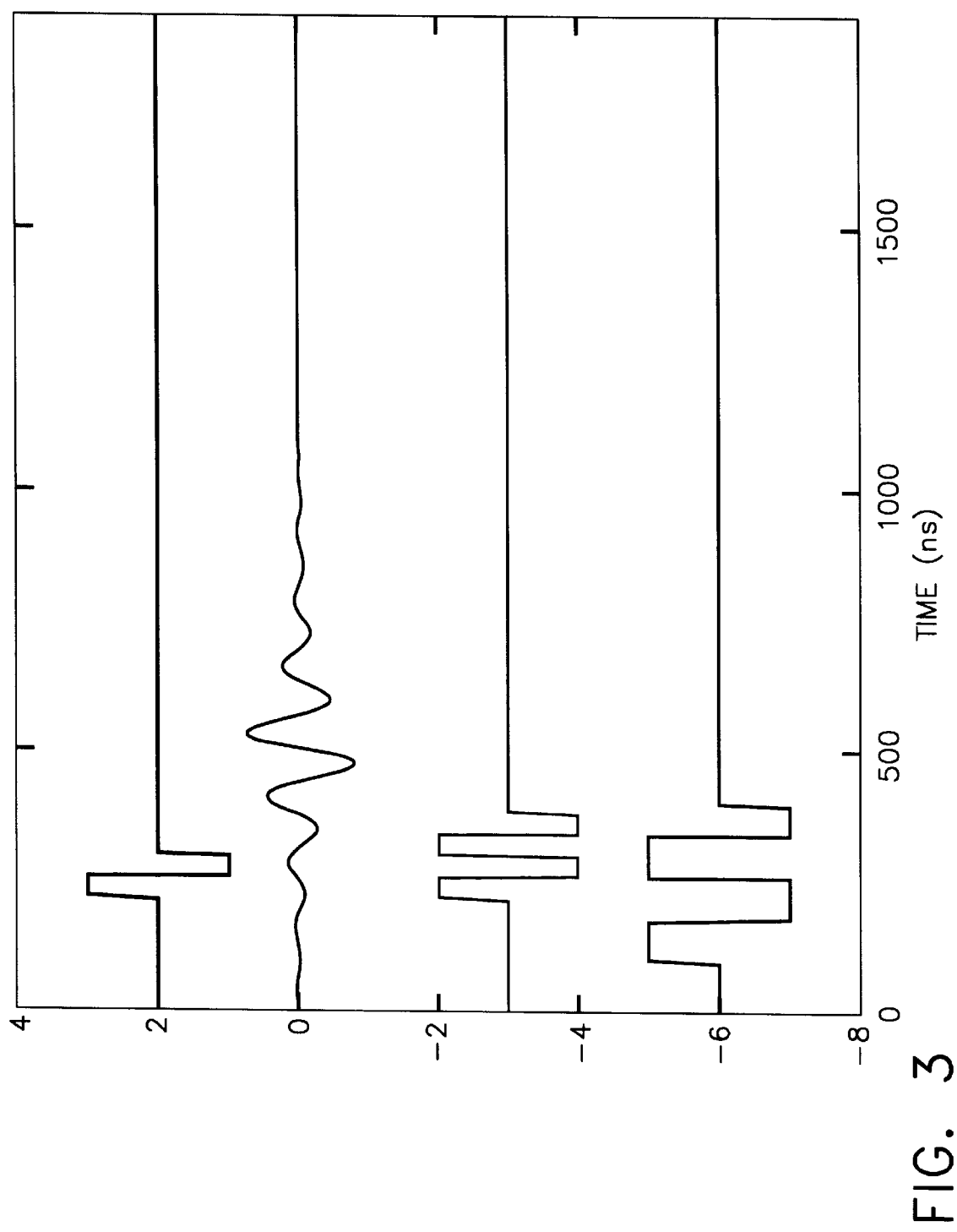
FIG. 3 is a graph of amplitude versus time showing the following signals used for simulation, in order from top to bottom: a one-cycle impulse excitation; the transducer impulse response; a two-cycle high-frequency excitation; and a two-cycle low-frequency excitation.

To understand the theory of operation of the invention, consider an ultrasonic transducer with a finite Gaussian impulse response as shown in FIG. 3B. This transducer was examined under two different conditions. First, a single-cycle excitation waveform as shown in FIG. 3A was applied to the transducer. The excitation waveform was at the resonance frequency of the transducer. Second, the same transducer was also excited with two waveforms, as shown in FIGS. 3C and 3D, each of which was a two-cycle waveform, one at a frequency above and the other at a frequency below the resonance frequency of the transducer. The overall pulse length for each of these two narrow bandwidth excitation waveforms was longer than the single-cycle excitation waveform used previously. Hence the integrated energy for the two-cycle waveforms, FIGS. 3C and 3D, is larger than the energy in the single-cycle waveform, FIG. 3A.

Figure 4A:
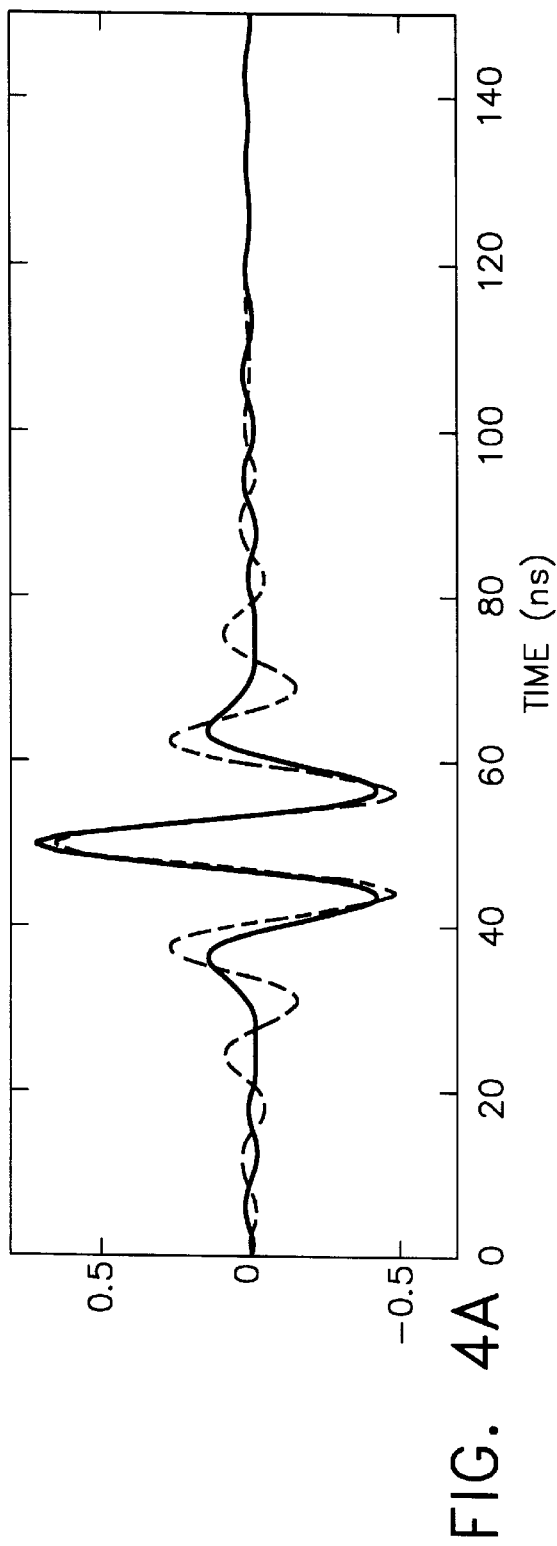
FIG. 4A is a graph of amplitude versus time showing the response (dotted line) to a one-cycle impulse excitation at the resonance frequency multiplied by two and the overall response (solid line) to the two narrowband two-cycle excitations depicted in FIG. 3.
Figure 4B:
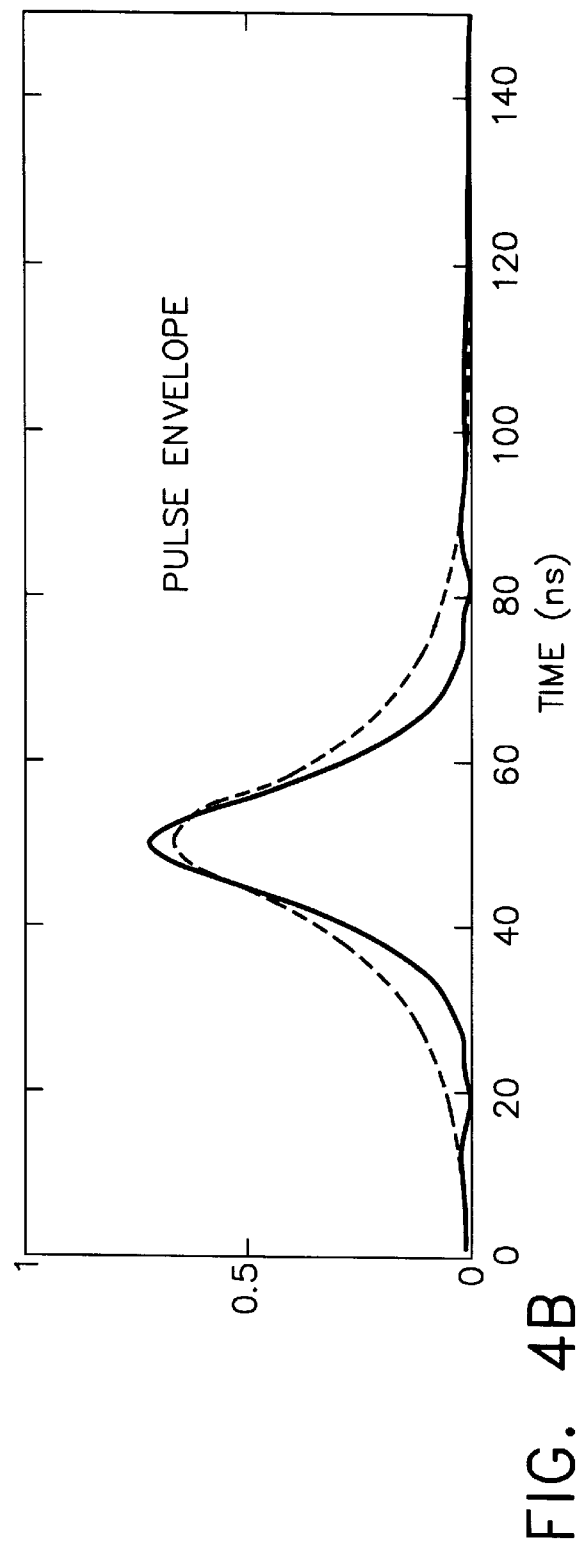
FIG. 4B is a graph of amplitude versus time showing the pulse envelopes of the responses depicted in FIG. 4A.

The transducer responses to the two waveforms from the two narrow-bandwidth pulses were added while maintaining the phase information (in the complex domain, i.e., before envelope detection). This response was compared to the response to the single-cycle excitation multiplied by two in FIGS. 4A and 4B. The response to the synthetic waveform has a shorter ringdown time with a corresponding improvement in bandwidth together with a small increase in the sensitivity. This illustrates the advantage of synthetic transmit waveform design.

Figure 5A:
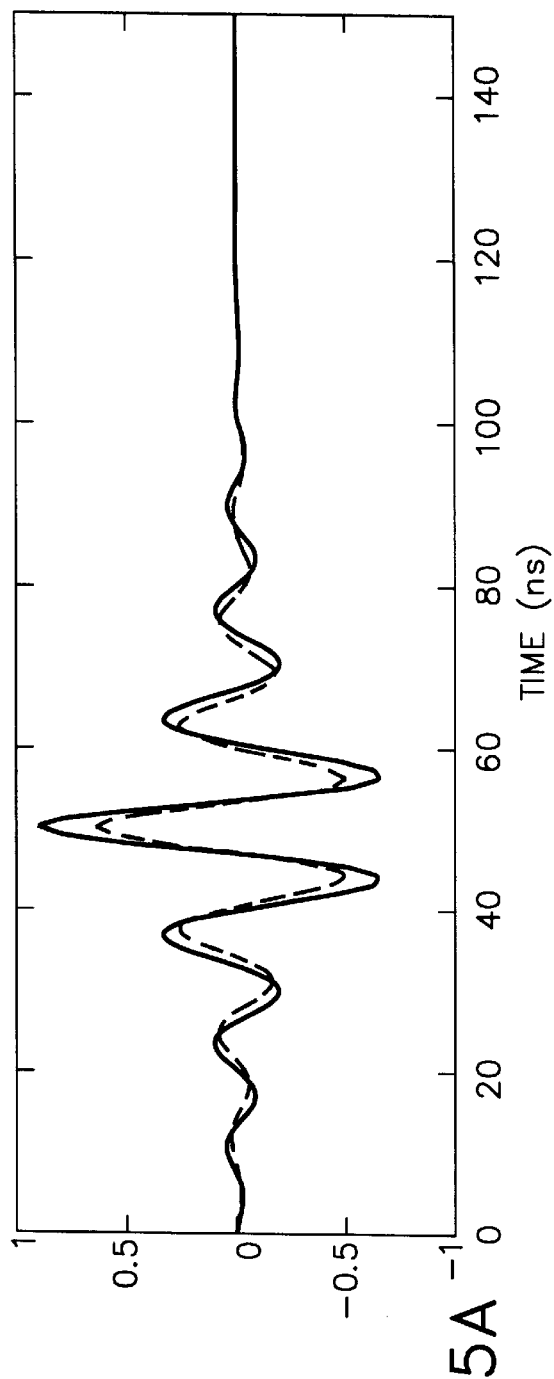
FIG. 5A is a graph of amplitude versus time showing the response (dotted line) to a one-cycle impulse excitation at the resonance frequency multiplied by two and the overall response (solid line) to two narrowband two-cycle excitations having frequencies closer to the resonance frequency of the transducer than the frequencies of the two narrowband two-cycle excitations depicted in FIG. 3.
Figure 5B:
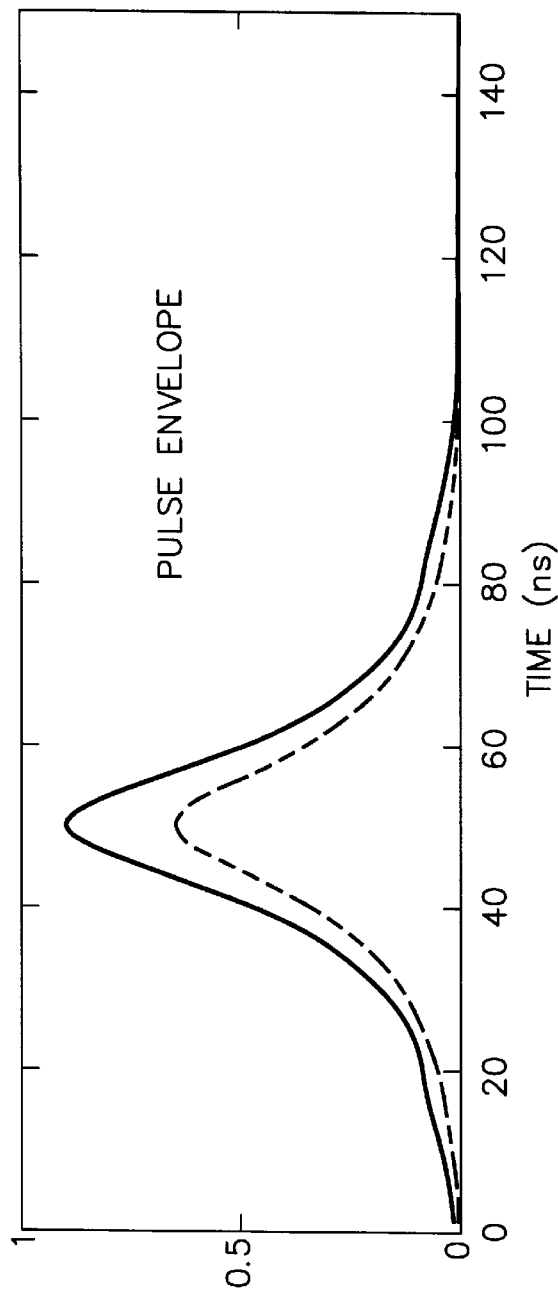
FIG. 5B is a graph of amplitude versus time showing the pulse envelopes of the responses depicted in FIG. 5A.

Alternatively, the emphasis can be to increase the peak-to-peak pressure of the detected pulse. Again the same analysis was performed on the response using the synthetic transmit waveforms approach compared to the single-cycle excitation at the resonance frequency multiplied by two. The improved sensitivity obtained from synthetic transmit design approach is shown in FIGS. 5A and 5B. In this case, the two narrowband two-cycle excitations had frequencies closer to the resonance frequency of the transducer than the frequencies of the two narrowband two-cycle excitations depicted in FIG. 3 and used to generate FIGS. 4A and 4B. If the synthetic waveform is made of more than two transmit waveforms, then even larger improvements can be expected. However, it is desirable to keep the number of transmit waveforms close to two in order to maintain a high frame rate.

The increased bandwidth using the synthetic transmit waveform also improves the depth of field. The beam shape is strongly influenced by the pulse shape. The near-field interference and the sidelobes in the far field will be reduced as the pulse length becomes shorter. The position of focus, the depth of field and the lateral beam profile are a function of the wavelength. A broadband impulse response comprises a number of frequency components. Hence the increased bandwidth also increases the depth of field together with a reduction in the sidelobe level. The effect of impulse response on the beam profile has been described by W. L. Beaver in: "Sonic Nearfields of a Pulsed Piston Radiator", J. Acoust. Soc. America, Vol. 56, pp. 1043–1048, 1974; J. A. Hossak in: "Extended Focal Depth Imaging for Medical Ultrasound", IEEE Ultrasonics Symposium, November 1996; and P. Fish in: "Physics and Instrumentation of Diagnostic Medical Ultrasound", John Wiley & Sons, 1990, pp. 37–39.

Figure 1:
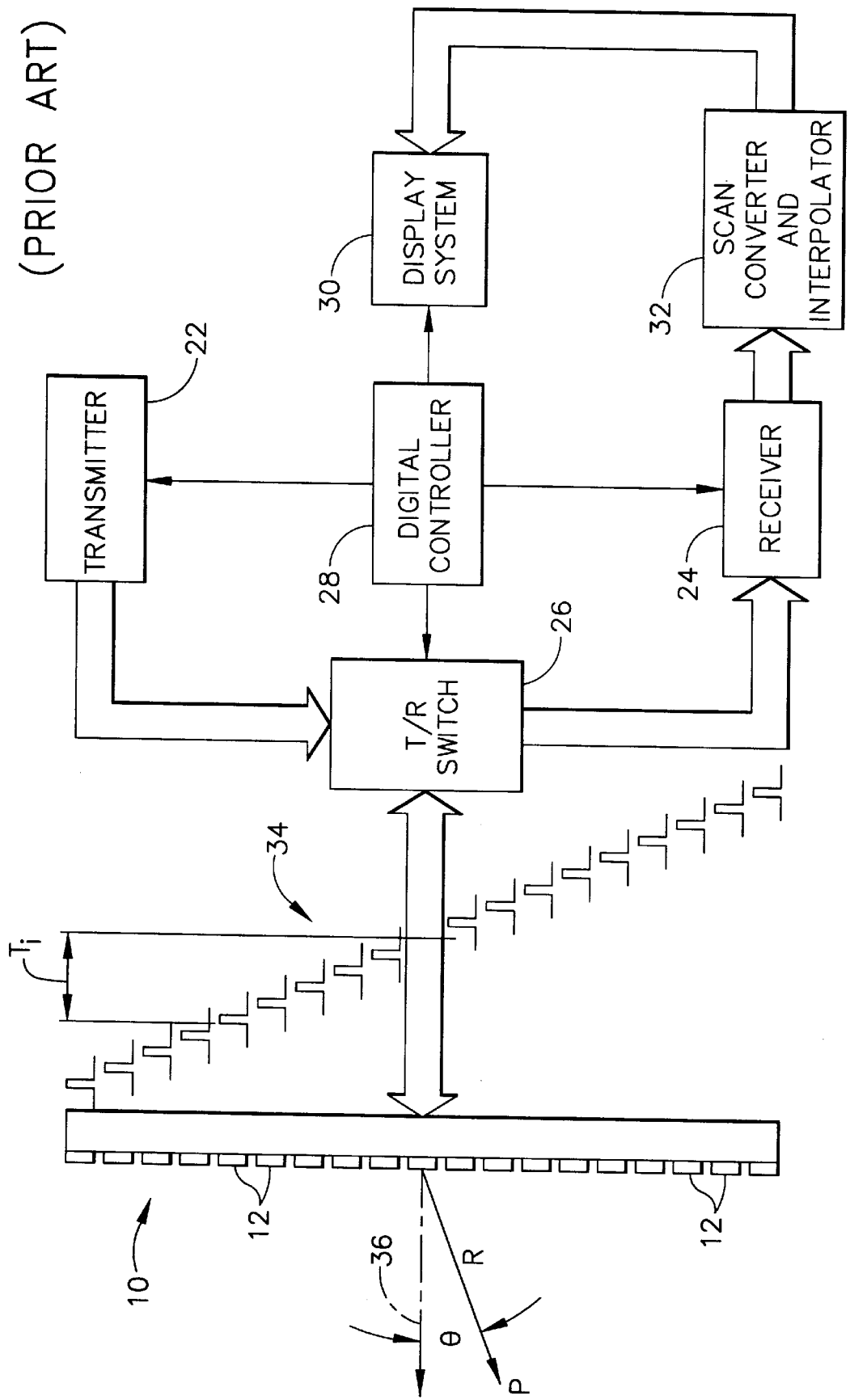
FIG. 1 is a block diagram showing the major functional subsystems within a real-time ultrasound imaging system.
Figure 2:
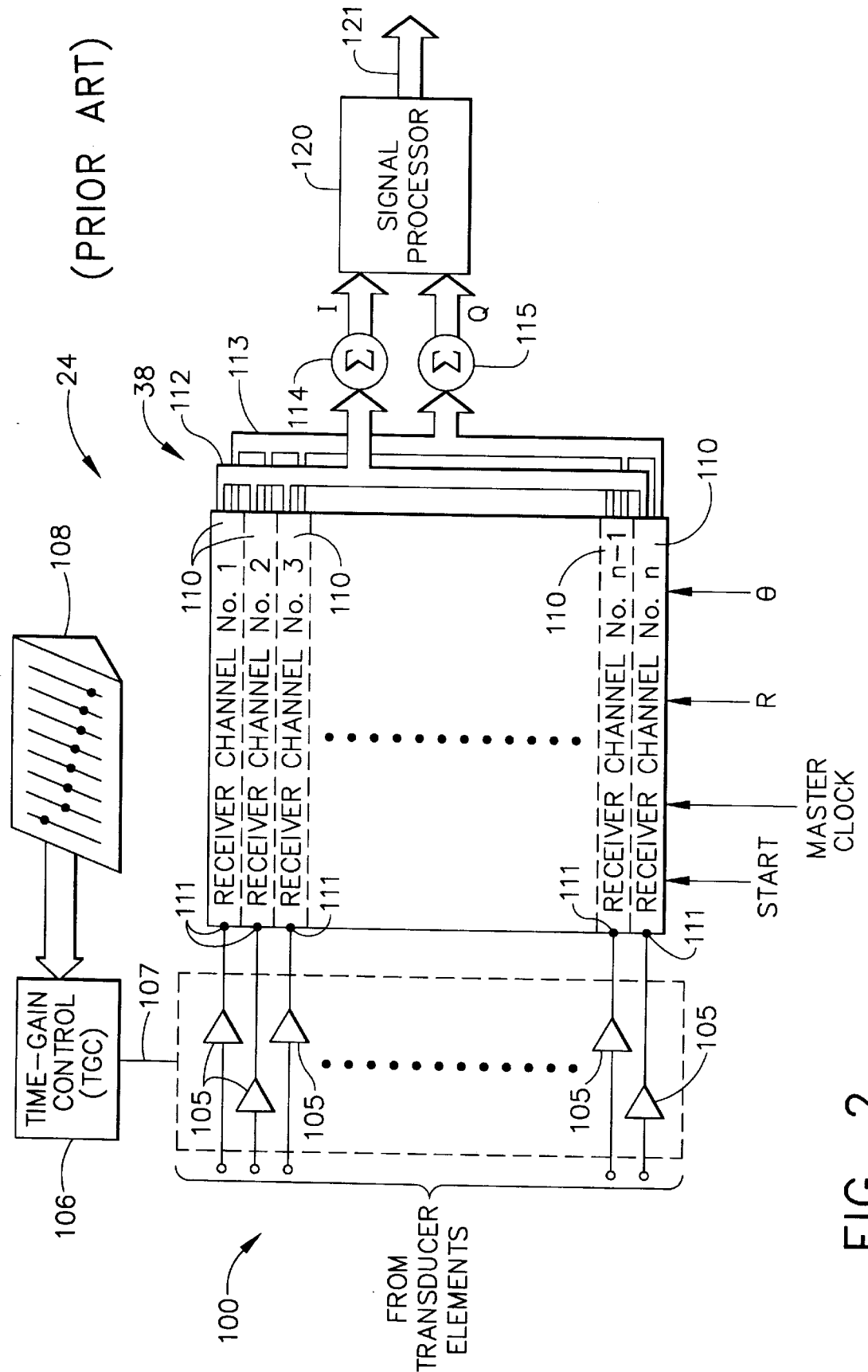
FIG. 2 is a block diagram of a receiver which forms part of the system of FIG. 1.

In accordance with the present invention, the transmitter 22 (see FIG. 1) comprises means for transmitting a first transmit ultrasound waveform having a first frequency spectrum which is centered at a first frequency by exciting selected transducer elements 12 during a first time interval and means for transmitting a second transmit ultrasound waveform having a second frequency spectrum which is centered at a second frequency by exciting selected transducer elements during a second time interval immediately subsequent to the first time interval. The first transmit ultrasound waveform is focused at a first focal point and the second transmit ultrasound waveform is focused at a second focal point near or identical to the first focal point. Furthermore, the second frequency is different than the first frequency.

Figure 9:
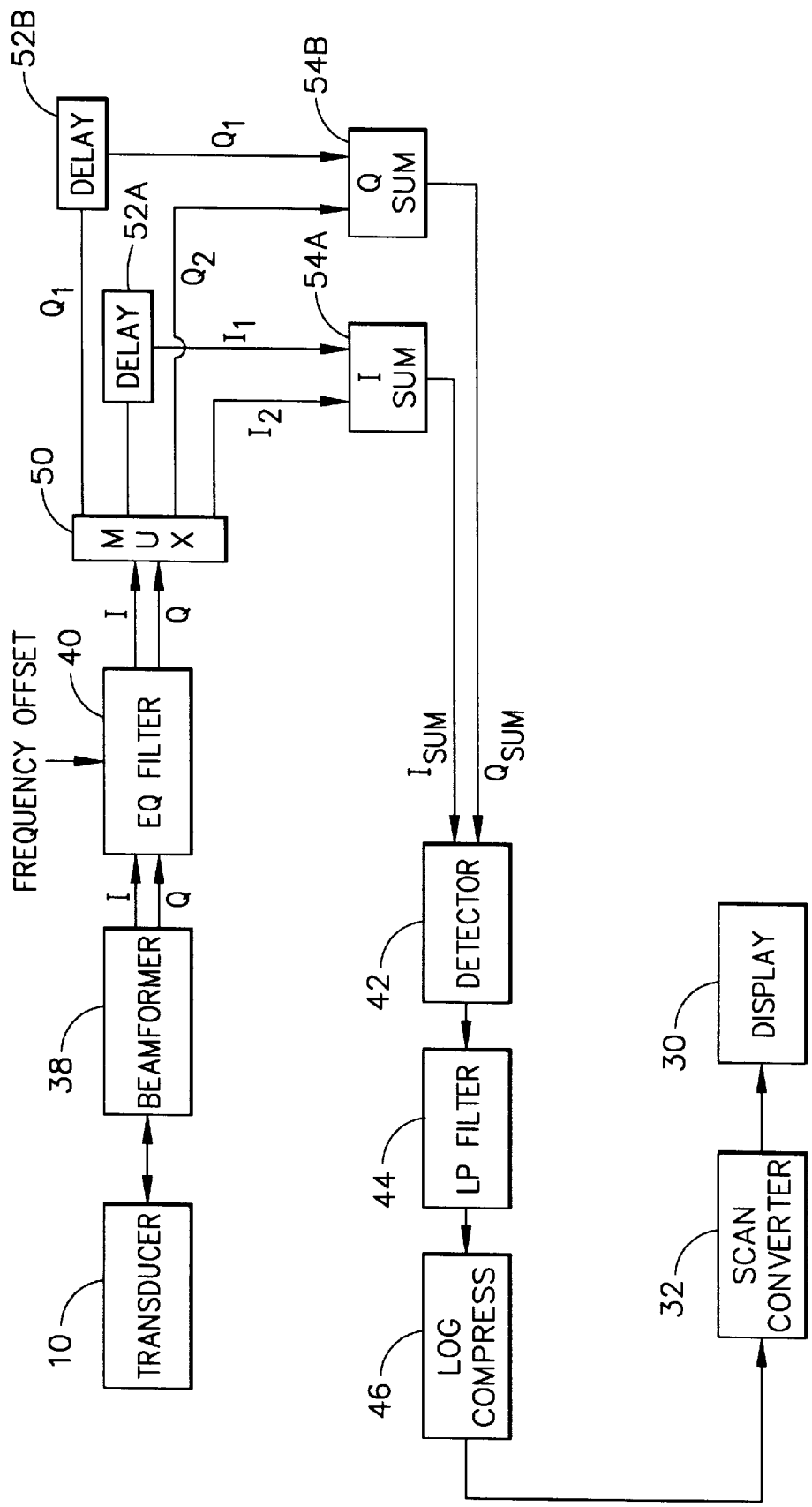
FIG. 9 is a block diagram showing the main signal processing blocks of an ultrasonic imager with a complex signal detector in accordance with the invention.

Referring to FIG. 9, the invention further comprises conventional means, i.e., transducer 10 and beamformer 38, for forming a first basebanded complex signal pair (I1 and Q1 signals) of a first receive ultrasound waveform derived from the portion of the first transmit ultrasound waveform reflected back to selected receiving transducer elements by scatterers in a focal zone encompassing the first focal point and subsequently forming a second basebanded complex signal pair (I2 and Q2 signals) of a second receive ultrasound waveform derived from the portion of the second transmit ultrasound waveform reflected back to selected receiving transducer elements by scatterers in a focal zone encompassing the second focal point. The receiver transfer function would remain the same for both waveforms. However, the amplitudes would be different in order to compensate for the tissue attenuation which would be different for two frequencies.

The theory of operation in accordance with the present invention will now be described with reference to an ultrasound imaging system of the type having a complex signal detector, as shown in FIG. 9. In this system, an equalization filter 40 receives the complex I and Q outputs from the beamformer 38 and passes a bandwidth which is a function of the bandwidth of the input signals. In accordance with the invention, the outputs of equalization filter 40 are transmitted to a multiplexer 50 which selectively multiplexes the first and second complex signal pairs as follows: the I1 and Q1 signals are multiplexed to the delay circuits, or buffers, 52A and 52B respectively during one cycle; and the I2 and Q2 signals are multiplexed directly (without delay) to the adders 54A and 54B respectively during the next cycle. The delay circuits 52A and 52B provide a delay of one cycle so that adder 54A receives the I1 and I2 signals and adder 54B receives the Q1 and Q2 signals during the second cycle. Adder 54A forms the sum Isum=I1+I2; adder 54B forms the sum Qsum=Q1+Q2. The complex signals Isum and Qsum are then input into envelope detector 42, which calculates the function (Isum2+Qsum2)1/2.

Thereafter the envelope is passed through a low pass filter 44 and then the filtered envelope undergoes logarithmic data compression (block 46). The logcompressed signal is output to the scan converter 32 and then displayed as a vector on monitor 30.

In practice, the received signals for the different transmit frequency waveforms can have very different amplitudes due to frequency-dependent tissue attenuation. To compensate for tissue attenuation effects, different weighting coefficients should be applied to the different transmit waveforms, or to the different received signals before the coherent sum or a combination of both. In the preferred method the coefficients should vary dynamically with time since the goal is to generate a synthetic signal with a symmetrical spectrum at all depths. The coefficients can be specified in terms of the tissue absorption and frequency-dependent scattering characteristics.

The weighting coefficients are realized in the time gain control section. Referring to FIG. 10, the time gain control section 100' comprises two sets of potentiometers 108$a$ and 108$b$ which are alternately connected to the time gain circuit 106 by means of a set of switches 120. The settings of potentiometers 108$a$ are selected to provide a first set of weighting coefficients, which are used to adjust the amount of amplification provided by amplifiers 105 during a first receive interval; the settings of potentiometers 108$b$ are selected to provide a second set of weighting coefficients, which are used to adjust the amount of amplification provided by amplifiers 105 during a second receive interval. In accordance with the preferred embodiment, all of the weighting coefficients of the first set have a first value; likewise all of the weighting coefficients of the second set have a second value different than the first value. The first receive interval transpires during reception of the received signal produced in response to the first transmit wave form; the second receive interval transpires during reception of the received signal produced in response to the second transmit waveform.

The attenuation effect can be further compensated by having a greater number of cycles in the higher frequency transmit waveform, which effectively increases the energy in the higher frequency band edge of the synthetic transmit waveform. Alternatively, a dynamic equalization filter can be applied to each of the different received signals to compensate for tissue attenuation effects, before they are summed to produce a synthetic wideband signal. Such equalization filters can be bandpass or complex low pass filters depending on whether the beamformed data is of RF/IF or baseband type respectively. The advantage of using equalization filtering is that it can potentially realize additional bandwidth and/or sensitivity gain. Specifically, for narrowband excitation, a narrowband equalization filter can be applied to reject out-of-band noise before the different received signals are summed. The equalization filter can also be designed to "whiten" received spectra that are otherwise skewed, and/or to reject undesirable spectral sidelobes.

Figure 6A:
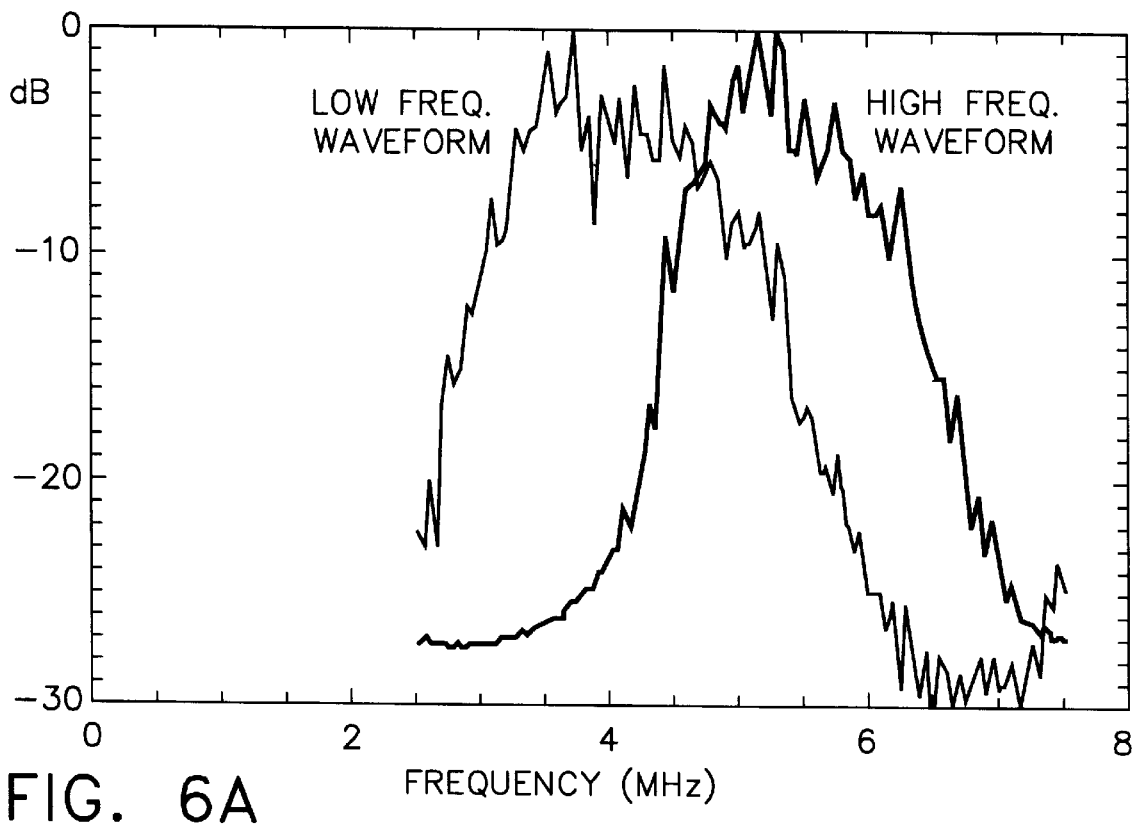
FIG. 6A is a graph of amplitude versus frequency showing the ensemble-averaged spectra of the received signals from two narrowband transmit waveforms of different frequency in a phantom experiment.
Figure 6B:
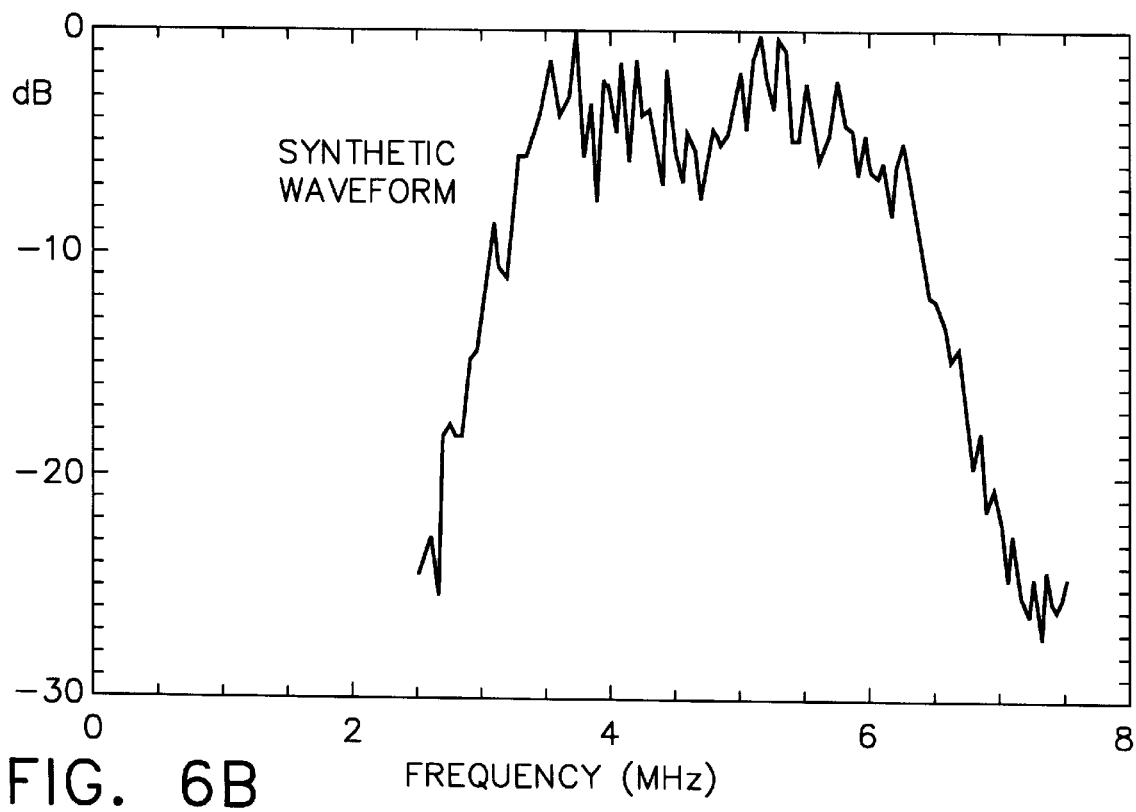
FIG. 6B is a graph of amplitude versus frequency showing the spectrum of the synthetic transmit waveform obtained by forming the coherent sum of the two narrowband received signals shown in FIG. 6A.
Figure 7A:
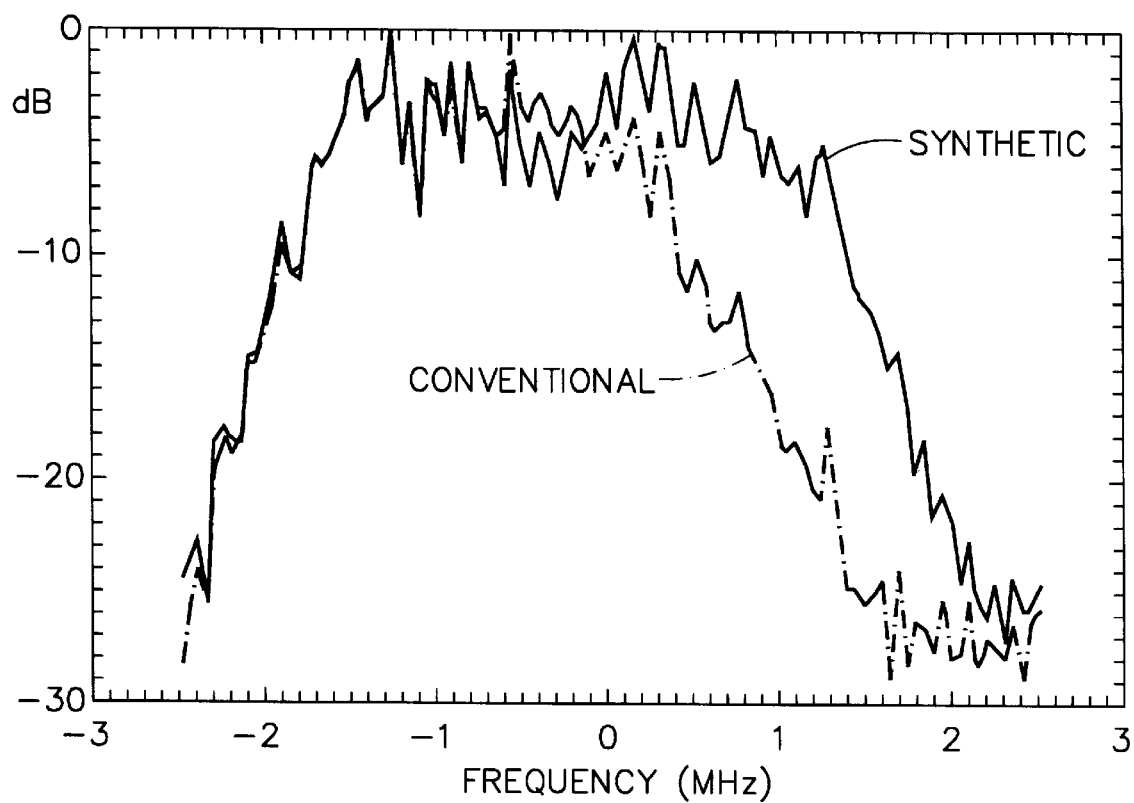
FIG. 7A is a graph of amplitude versus frequency comparing the basebanded synthetic signal spectrum of FIG. 6B and the received signal spectrum from an optimal conventional transmit waveform.
Figure 7B:
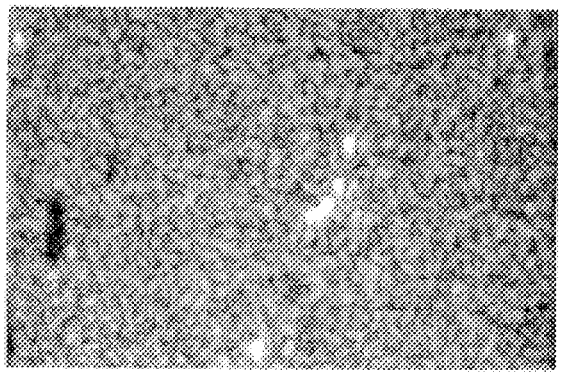
FIG. 7B shows corresponding phantom image segments for the optimal conventional transmit waveform and the synthetic transmit waveform shown in FIG. 7A.
Figure 7B:
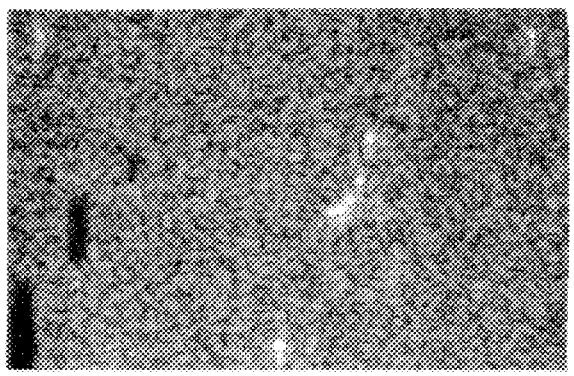

The proposed theory of operation of the present invention was verified by a series of 5-MHz imaging experiments on a standard phantom. An I/Q beamformed data set for an optimum conventional transmit waveform design was recorded via a data acquisition unit. A similar data set was also obtained using the synthetic transmit waveform design approach of the invention. B-mode images were created off line by taking the polar magnitude of the I/Q data, and then displaying the logcompressed images on a Sun workstation. To produce the synthetic waveforms, two "narrowband" transmit waveforms were used (one of two received waveforms was actually equalization filtered to remove an undesirable spectral sidelobe). FIG. 6A shows the two corresponding received spectra which, for the purpose of comparison, have been normalized and shifted back to the demodulation frequency of 5 MHz. These spectra represent the ensemble-average of 10 successive central scan lines, where each sample spectrum is computed by taking a complex Fast Fourier Transform over a 1-cm axial window centered at a depth of 3.5 cm depth. To create the synthetic signal as described in the previous section, the two signals were normalized in mean amplitude and summed (in baseband) before detection, and the result is shown in FIG. 6B. There is a significant increase in bandwidth in the composite response relative to each of the two transmit waveforms. FIG. 7A shows the comparison between the synthetic spectrum (FIG. 6B) and the received spectrum from the optimal conventional transmit waveform. The bandwidth improvements at −6, −10 and −20 dB below the spectrum peak are 30%, 40% and 14%, respectively. FIG. 7B shows the corresponding image segments of the phantom, which clearly demonstrate an increased pin resolution and much finer speckle texture and increased depth of focus with the synthetic waveform approach.

Figure 8A:
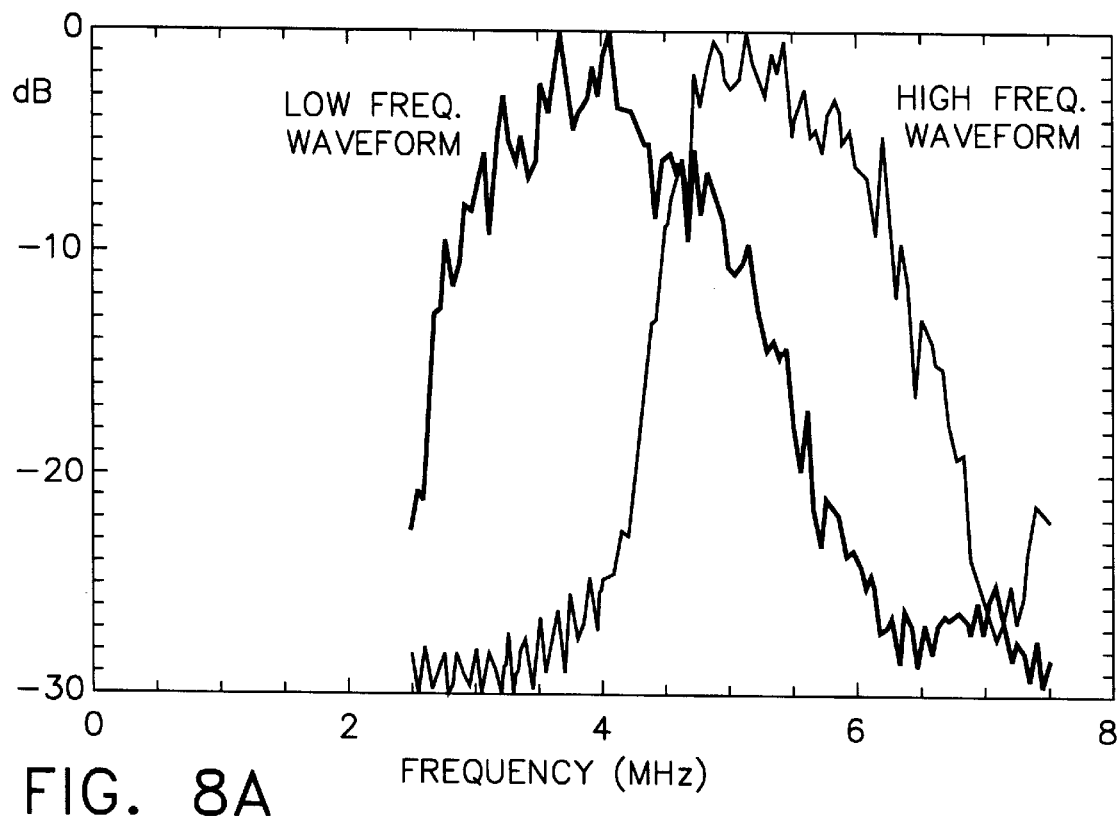
FIG. 8A is a graph of amplitude versus frequency showing the spectra of the received signals from two narrowband transmit waveforms of high and low frequency, respectively, used to construct the synthetic waveform in a renal scan performed on a human body.
Figure 8B:
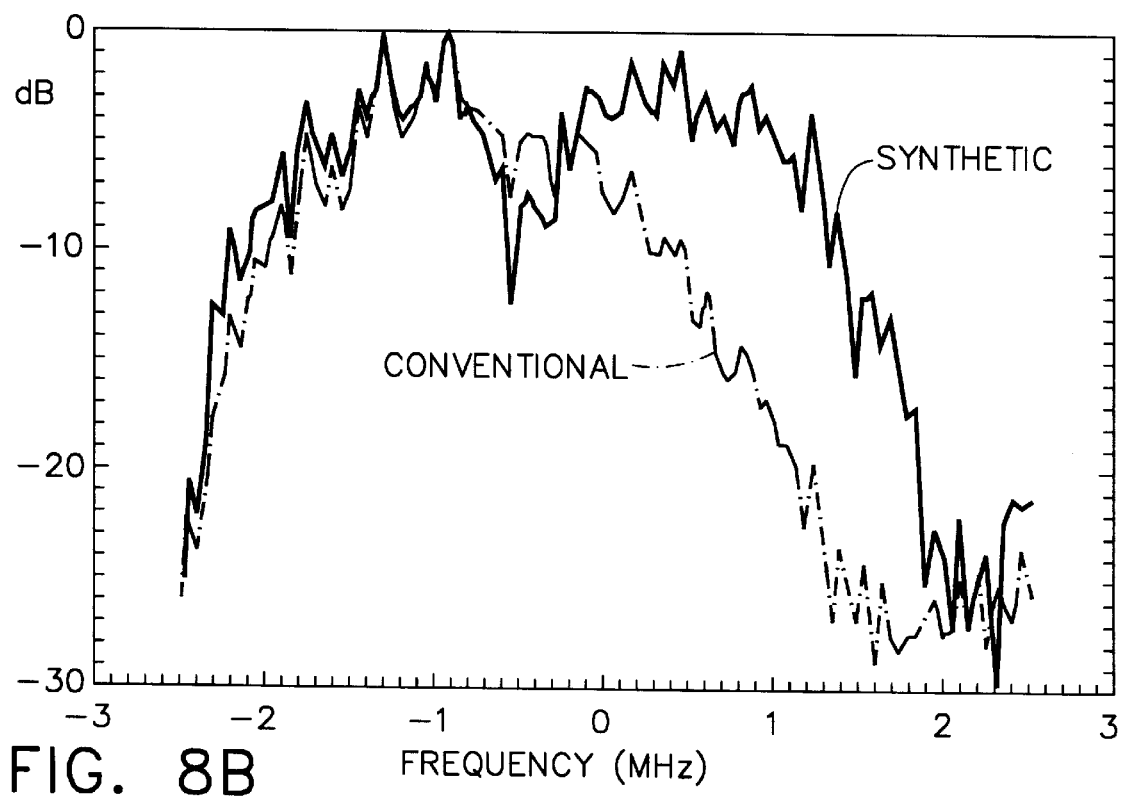
FIG. 8B is a graph of amplitude versus frequency comparing the spectrum of the synthetic transmit waveform obtained by forming the coherent sum of the two received signals shown in FIG. 8A and the conventional transmit waveform (wideband pulse).

A similar experiment was performed in the body. Here a series of renal scans were performed using exactly the same set of transmit waveforms as in the phantom experiment. The received signals for the synthetic transmit methods (corresponding to those of FIGS. 6A and 7A) are shown in FIGS. 8A and 8B. As in the phantom case, the individual low- and high-frequency components add up to produce a synthetic signal which has even greater bandwidth than a conventional wideband pulse. B-mode images created off-line also showed a finer speckle texture and increased depth of focus with the synthetic waveform approach.

As with conventional synthetic aperture methods, one requirement for the synthetic transmit waveform design of the present information is that the phase relation be maintained between two successive firings. If there is any motion of the object or the transducer during the interval between the two successive firings, the phase information will be distorted. This results in a degradation of the image compared to conventional techniques. In order to prevent this error, the maximum tissue displacement between successive firings must be less than or equal to one-tenth of a wavelength. Although this is a conservative estimate, it may require that successive transmit waveforms be fired over a very short time interval such that successive vectors have overlapping periods. For example, when operating at 3 MHz, the overlapping can be less than or equal to 4 cm for adequate temporal sampling. With such overlapping periods, having different transmit waveforms may help if the receiver can be uniquely set up for optimal detection of each of these signals. Furthermore, it is advantageous to fire the high-frequency signal first before firing the low-frequency waveform, since the high-frequency signal would be attenuated at a higher rate. This would reduce the amount of acoustic noise which remains from the previous firing. This is especially important when vectors with overlapping periods are fired. These are the vector sets whereby the second vector is fired while the data corresponding to the first vector are still being gathered.

It is also possible to incorporate motion estimation and motion compensation algorithms, such as correlation techniques, to compensate for tissue motion during successive firings. This would reduce the amount of constraint on the firing interval between two successive firings.

The basic concept of the invention can be extended in many directions. For example, the synthetic transmit waveforms can be designed such that the axial resolution is improved in the near field (e.g., using narrowband waveforms of the type used to produce the responses shown in FIGS. 4A and 4B) and the sensitivity is improved in the far field (e.g., using narrowband wave-forms of the type used to produce the responses shown in FIGS. 5A and 5B). This method would fully utilize the advantages of the synthetic transmit waveform design at all depths. This could depend on the clinical examination application. Alternatively, two synthetic transmit waveforms can be used in the near field and three or more waveforms at greater depths.

The two transmit waveforms can have different numbers of cycles. For example, it can be three cycles at the higher-frequency excitation and two cycles at the lower-frequency excitation. This can potentially increase the energy in the region of the spectrum which is going to be attenuated at a higher rate due to higher frequency. Hence the two transmit waveforms can have different bandwidths.

Typical transmit waveform are tonebursts with a duration of one or more cycles. This would have a frequency spectrum which is a sinc ($[\sin(x)/x]$) function. The preferred mode of operation would design the two or more waveforms such that the frequency domain sidelobes of one waveform would overlap with the nulls (or zeros) of the proceeding waveform. When the two waveforms are combined using the synthetic waveform design, the frequency domain response would have reduced sidelobes with a corresponding shorter time domain ringdown time.

The F number or active element spacing can be changed to maintain a constant beam width for the two firings. Hence, when operating at the lower frequency a larger aperture can be used to maintain a constant lateral point spread function. Note that this is not the same as the conventional synthetic aperture approach in which the two firings of the same waveform from different sub-apertures are combined to achieve a larger effective aperture.

The proposed algorithm can be applied to power Doppler imaging (PDI). The axial resolution or sensitivity can be improved at different depths or for different applications. In this case for every packet of data in the PDI processing two or more firings must be made very rapidly. A similar scheme can be applied to color flow imaging.

It is also possible to combine the color and/or Doppler mode with B-mode (or gray scale) imaging. The lower-frequency waveforms with the higher sensitivity can be used on its own for flow detection (Doppler or color mode) and the composite of high- and low-frequency waveforms can be used for the B-mode, where contrast and detail resolution are more important.

In order to maintain a high frame rate, the algorithms can be applied to a restricted region of interest. Hence the number of transmit focal zones can be reduced together with the number of beams which are fired over the region of interest.

In order to reduce the effect on frame rate, two successive transmit beams with the focus at slightly different positions can be used to cover two transmit focal zones with two firings. This would mitigate the reduction in the frame rate. However, the temporal sampling requirement still remains (i.e., rapid firing of two transmit waveforms). As an example, consider an imaging system in which four focal zones are employed to cover the region of interest, each focal zone having a depth of 3 cm. If two firings are focused at a respective focal point in the four focal zones, a total of eight firings would be required. Alternatively, the same 12 cm can be divided into three focal zones, each 4 cm deep. If for each of the three focal zones, two firings are focused at two different focal points separated by 1 cm, then the full 12 cm of depth can be covered by six firings instead eight, thereby mitigating the reduction in frame rate resulting from use of the invention.

The decision on either the bandwidth or sensitivity improvement can also depend on the type of vector being fired. For example, when firing the steered beams (beams which are not normal to the transducer or the aperture planes) the sensitivity can be improved. The bandwidth can be improved for all other cases.

Even if tissue attenuation is already compensated by other means, the narrowband synthetic transmit waveform together with the narrowband equalization filter can significantly improve the signal-to-noise ratio compared to conventional technologies.

One can possibly compensate for the motion-induced errors using correlation techniques, logical operators, gradient methods or optical flow techniques to compensate for any motion before performing the weighted sum. This way the potential phase errors introduced by the motion can be reduced or removed. Hence the algorithm can be applied at slow frame rates.

The synthetic waveform design can also be used for conventional contrast imaging as well as second harmonic imaging, when using various ultrasonic contrast agents. The longer transmit pulse in synthetic bandwidth imaging should enable use of lower maximum acoustic pressure or intensity. This extra degree of control in transmit signal level is likely to be very important for achieving the desirable effects in contrast imaging. Additionally, for second harmonic contrast imaging, the second harmonic frequency band in the transmit signal due to the spectral leakage and/or nonlinear propagation effects can be suppressed by using longer or more puretone signals. This may prove to be important for discriminating the second harmonic signals generated by the contrast agents from direct backscattering of the second harmonic frequency band from tissue.

Finally, in the synthetic waveform approach of the present invention, two or more narrowband excitations may help reduce phase aberration effects caused by the fat/muscle surface layers.

The foregoing preferred embodiments have been disclosed for the purpose of illustration. Variations and modifications will be readily apparent to those skilled in the art of baseband ultrasonic imaging systems. All such variations and modifications are intended to be encompassed by the claims set forth hereinafter.

We claim:

1. A method of operating an ultrasound imaging system having an array of transducer elements, comprising the steps of:

transmitting a first transmit ultrasound waveform having a first frequency spectrum which is centered at a first frequency by exciting selected transducer elements during a first time interval, said first transmit ultrasound waveform being focused at a focal point;

transmitting a second transmit ultrasound waveform having a second frequency spectrum which is centered at a second frequency by exciting selected transducer elements during a second time interval, said second transmit ultrasound waveform being focused at said focal point, said second frequency being different than said first frequency, and said second time interval being immediately subsequent to said first time interval;

forming a first complex signal pair of a first receive ultrasound waveform derived from the portion of said first transmit ultrasound waveform reflected back to selected receiving transducer elements by scatterers in a focal zone encompassing said focal point;

forming a second complex signal pair of a second receive ultrasound waveform derived from the portion of said second transmit ultrasound waveform reflected back to selected receiving transducer elements by scatterers in said focal zone;

filtering said first and second complex signal pairs using the same filter transfer function for both waveforms;

adding said filtered first and second complex signal pairs to form a third complex signal pair having components which are the sum of the respective components of said first and second complex signal pairs;

forming the envelope of said third complex signal pair; and displaying an image vector which is a function of said envelope of said third complex signal pair.

2. The method as defined in claim 1, wherein said first frequency is greater than a resonance frequency of said transducer array and said second frequency is less than said resonance frequency.

3. The method as defined in claim 1, wherein the peak of the frequency domain sidelobes of the first waveform are at the same frequencies as the nulls of the second waveform.

4. The method as defined in claim 1, wherein the receiver for each of the two narrow bandwidth excitation waveforms comprise filters having narrow frequency bandwidth response to improve the signal-to-noise ratio of the imaging system.

5. The method as defined in claim 1, wherein the receiver filters corresponding to each of the two excitation waveforms have different impulse responses.

6. The method as defined in claim 1, wherein said first transmit ultrasound waveform has at least two cycles and said second transmit ultrasound waveform has at least two cycles.

7. The method as defined in claim 1, wherein said first transmit ultrasound waveform has a first number of cycles and said second transmit ultrasound waveform has a second number of cycles less than said first number of cycles.

8. The method as defined in claim 1, further comprising the step of using the first frequency signal for Doppler, color or power Doppler imaging, and when the first and second waveforms are combined, using the resultant waveform for gray scale (B-mode) imaging for improved resolution and depth of field.

9. The method as defined in claim 1, wherein the first and second transmit waveforms are only separated in time by the interval required to allow the acoustic signal from the first firing to decay to a typical level of approximately −40 dB.

10. The method as defined in claim 1, wherein the waveform having the higher frequency is transmitted first.

11. The method as defined in claim 1, wherein the phase of the first and second transmit waveforms is adjusted to minimize the point spread function.

12. The method as defined in claim 1, wherein any motion in the image between the first and second firings is detected and compensated before the first and second complex waveforms are added.

13. The method as defined in claim 1, wherein said first transmit ultrasound waveform is transmitted by exciting selected elements in a first aperture of said transducer array, and said second transmit ultrasound waveform is transmitted by exciting selected elements in a second aperture of said transducer array, said first aperture being wider than said second aperture.

14. The method as defined in claim 13, wherein said first and second apertures are selected to maintain a substantially constant lateral point spread function.

15. The method as defined in claim 1, further comprising the steps of:
weighting said first receive ultrasound waveform using a first weighting coefficient; and
weighting said second receive ultrasound waveform using a second weighting coefficient different than said first weighting coefficient,
wherein said first and second weighting coefficients are different at all depths for said first and second waveforms, said first and second weighting coefficients being selected to compensate for frequency-dependent tissue attenuation in said focal zone.

16. A method of operating an ultrasound imaging system having an array of transducer elements, comprising the steps of:
transmitting a first transmit ultrasound waveform having a first frequency spectrum which is centered at a first frequency by exciting selected transducer elements during a first time interval, said first transmit ultrasound waveform being focused at a first focal point in a focal zone;
transmitting a second transmit ultrasound waveform having a second frequency spectrum which is centered at a second frequency by exciting selected transducer elements during a second time interval, said second transmit ultrasound waveform being focused at a second focal point in said focal zone, said first and second focal points being separated by a distance less than a depth of said focal zone, said second frequency being different than said first frequency, and said second time interval being immediately subsequent to said first time interval;
forming a first complex signal pair of a first receive ultrasound waveform derived from the portion of said first transmit ultrasound waveform reflected back to selected receiving transducer elements by scatterers in said focal zone;
forming a second complex signal pair of a second receive ultrasound waveform derived from the portion of said second transmit ultrasound waveform reflected back to selected receiving transducer elements by scatterers in said focal zone;
filtering said first and second complex signal pairs;
adding said filtered first and second complex signal pairs to form a third complex signal pair having components which are the sum of the respective components of said first and second complex signal pairs;
forming the envelope of said third complex signal pair; and
displaying an image vector which is a function of said envelope of said third complex signal pair.

17. The method as defined in claim 16, wherein said first frequency is greater than a resonance frequency of said transducer array and said second frequency is less than said resonance frequency.

18. The method as defined in claim 16, wherein said first transmit ultrasound waveform has at least two cycles and said second transmit ultrasound waveform has at least two cycles.

19. The method as defined in claim 16, wherein said first transmit ultrasound waveform has a first number of cycles and said second transmit ultrasound waveform has a second number of cycles less than said first number of cycles.

20. The method as defined in claim 16, wherein said first transmit ultrasound waveform is transmitted by exciting selected elements in a first aperture of said transducer array, and said second transmit ultrasound waveform is transmitted by exciting selected elements in a second aperture of said transducer array, said first aperture being wider than said second aperture.

21. The method as defined in claim 20, wherein said first and second apertures are selected to maintain a substantially constant lateral point spread function.

22. The method as defined in claim 16, further comprising the steps of:
weighting said first receive ultrasound waveform using a first weighting coefficient; and
weighting said second receive ultrasound waveform using a second weighting coefficient different than said first weighting coefficient,
wherein said first and second weighting coefficients are selected to compensate for frequency-dependent tissue attenuation in said focal zone.

23. The method as defined in claim 16, further comprising the step of using the first frequency signal for Doppler, color or power Doppler imaging, and when the first and second waveforms are combined, using the resultant waveform for gray scale (B-mode) imaging for improved resolution and depth of field.

24. The method as defined in claim 16, wherein the first and second transmit waveforms are only separated in time by the interval required to allow the acoustic signal from the first firing to decay to a typical level of approximately −40 dB.

25. The method as defined in claim 16, wherein the waveform having the higher frequency is transmitted first.

26. The method as defined in claim 16, wherein the phase of the first and second transmit waveforms is adjusted to minimize the point spread function.

27. The method as defined in claim 16, wherein any motion in the image between the first and second firings is detected and compensated before the first and second complex waveforms are added.

28. A ultrasound imaging system comprising:
an array of ultrasound transducer elements;
means for transmitting a first transmit ultrasound waveform having a first frequency spectrum which is centered at a first frequency by exciting selected transducer elements during a first time interval, said first transmit ultrasound waveform being focused at a focal point;
means for transmitting a second transmit ultrasound waveform having a second frequency spectrum which is centered at a second frequency by exciting selected transducer elements during a second time interval, said second transmit ultrasound waveform being focused at said focal point, said second frequency being different than said first frequency, and said second time interval being immediately subsequent to said first time interval;

beamforming means for generating first and second complex signal pairs of first and second receive ultrasound waveforms respectively derived from the respective portions of said first and second transmit ultrasound waveforms reflected back to selected receiving transducer elements by scatterers in a focal zone encompassing said focal point;

means for filtering said first and second complex signal pairs;

means for adding said filtered first and second complex signal pairs to form a third complex signal pair having components which are the sum of the respective components of said first and second complex signal pairs;

an envelope detector for forming the envelope of said third complex signal pair; and means for displaying an image vector which is a function of said envelope of said third complex signal pair.

29. The system as defined in claim 28, wherein said first frequency is greater than a resonance frequency of said transducer array and said second frequency is less than said resonance frequency.

30. The system as defined in claim 28, further comprising:

means for weighting said first receive ultrasound waveform using a first weighting coefficient; and means for weighting said second receive ultrasound waveform using a second weighting coefficient different than said first weighting coefficient, wherein said first and second weighting coefficients are selected to compensate for frequency-dependent tissue attenuation in said focal zone.

31. The system as defined in claim 28, wherein said first and second transmit ultrasound waveforms are transmitted from different sub-apertures of said array of ultrasound transducer elements.

* * * * *